United States Patent [19]
Sanchez

[11] Patent Number: 6,091,949
[45] Date of Patent: Jul. 18, 2000

[54] LOCATION TRIGGERED BARRING OF CALL FORWARDING

[75] Inventor: Juan Antonio Sanchez, Madrid, Spain

[73] Assignee: Telefonaktiebolaget LM Ericsson (publ), Stockholm, Sweden

[21] Appl. No.: 09/104,758

[22] Filed: Jun. 25, 1998

[51] Int. Cl.[7] .............................. H04Q 7/24; H04M 1/64
[52] U.S. Cl. ......................... 455/417; 455/410; 455/414; 455/433; 455/440; 455/26.1; 455/31.1; 379/210; 379/211; 379/212
[58] Field of Search ..................................... 455/417, 410, 455/414, 433, 438, 440, 26.1, 31.1; 379/210, 211, 212

[56] References Cited

U.S. PATENT DOCUMENTS

| | | | |
|---|---|---|---|
| 5,018,194 | 5/1991 | Suzuki et al. | 379/207 |
| 5,195,131 | 3/1993 | Sano | 379/211 |
| 5,347,574 | 9/1994 | Morganstein | 379/210 |
| 5,440,623 | 8/1995 | Moore et al. | 379/67 |
| 5,577,103 | 11/1996 | Foti | 379/59 |
| 5,610,973 | 3/1997 | Comer | 379/59 |
| 5,657,382 | 8/1997 | Tamagawa et al. | 379/211 |
| 5,815,808 | 9/1998 | Valentine | 455/414 |
| 5,873,034 | 2/1999 | Alperovich et al. | 455/432 |
| 5,878,338 | 3/1999 | Alperovich et al. | 455/417 |
| 5,933,774 | 8/1999 | Bertocci | 455/417 |
| 5,978,673 | 11/1999 | Alperovich et al. | 455/417 |

FOREIGN PATENT DOCUMENTS

| | | | |
|---|---|---|---|
| 9629839 | 9/1996 | WIPO | H04Q 7/38 |
| 9634502 | 10/1996 | WIPO | H04Q 7/24 |
| 9747152 | 12/1997 | WIPO | H04Q 7/38 |
| 9826620 | 6/1998 | WIPO | H04Q 7/00 |

OTHER PUBLICATIONS

Mitsubishi Electric Corp. Abstract "Mobile Communication System for Inter Mobile Network Communications . . . ", Accession No. 97–464654, Aug. 15, 1997.

GPT LTD Abstract "Telecommunications System With Interconnected Networks . . . ", G. P. Boot et al.; Accession No. 96–211790, May 23, 1996.

Siemens AG Abstract "Telephone Call Diversion Procedure . . . ", T. Lehmann; Accession No. 96–000785, Nov. 12, 1995.

Motorola Inc. Abstract "Telephone Subscriber Equipment User Location Method . . . ", J. M. Gilbert et al., Accession No. 95–016432, Dec. 2, 1994.

Nippon Telegraph & Telephone Corp. Abstract "Call Reception Transfer System for Mobile Communication Systems . . . ", Accession No. 96–348659, Jun. 21, 1996.

Accessline Technologies Inc. Abstract, "Computer Controlled Paging and Telephone Communications System . . . ", R. P. Berg, et al., Accession No. 96–188708, Mar. 28, 1996.

Siemens AG Abstract "Incoming Call Handling Method for Mobile Communication Network . . . ", K. F. Neubauer et al., Accession No. 96–355040, Aug. 1, 1996.

NEC Corp. Abstract, "Economic Communication Control in Multi Processing System . . . ", Accession No. 94–282356, Jul. 26, 1994.

Anonymous Abstract "Context–Dependent Script for Intergrated Communication Services . . . ", Accession No. 91–080164, Feb. 25, 1991.

Anonymous Abstract "Directory Service for Intergrated Communication Service System . . . ", Accession No. 90–122894, Mar. 25, 1990.

(List continued on next page.)

*Primary Examiner*—Lee Nguyen
*Assistant Examiner*—Simon Nguyen
*Attorney, Agent, or Firm*—Jenkens & Gilchrist, P.C.

[57] ABSTRACT

Call forwarding service provided to a wireless mobile communication station is controlled by barring call forwarding from the wireless mobile communication station selectively based on the location of the wireless mobile communication station.

32 Claims, 6 Drawing Sheets

OTHER PUBLICATIONS

Toshiba KK Abstract "Call forwarding Device for PBX Calls Telephone Final Transfer . . . ", Accession No. 87–324214, Oct. 8, 1987.

Fujitsu Ltd. Abstract "Incoming Call Forward Transfer Method by Calling Terminal . . . ", Accession No. 85–300781, Oct. 22, 1985.

Tokyo Shibaura Electric Co. "Call–forward Service Device is Capable of Making . . . ", Accession No. 83–C2786K, Jan. 10, 1983.

FIG.2
| Mobile station | Area | Barred calls |
|---|---|---|
| MS 1 | A1 | Calls 1 |
| MS 2 | A2 | Calls 2 |
| ⋮ | ⋮ | ⋮ |
25, 27, 29, 21, 23
FIG.3
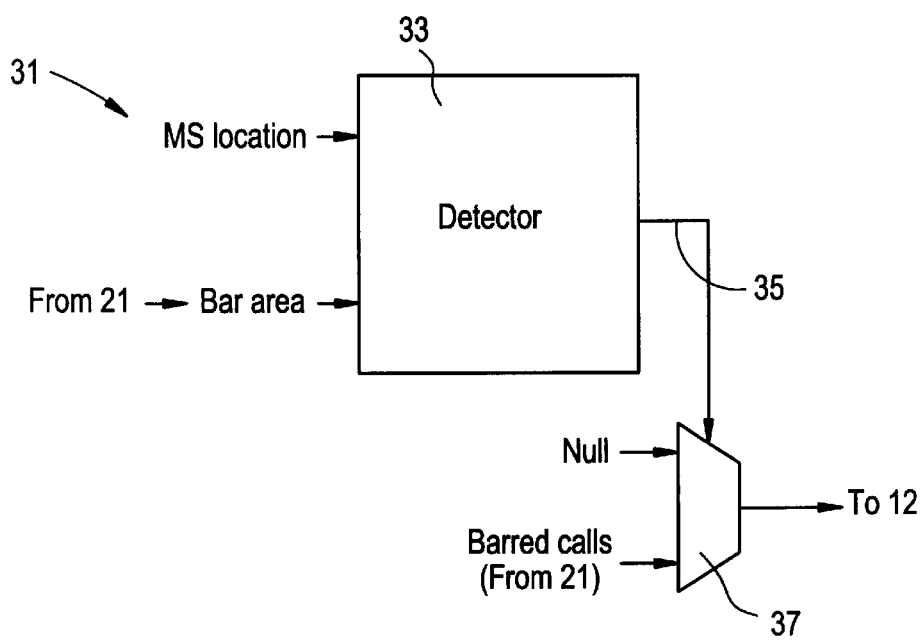
FIG.4
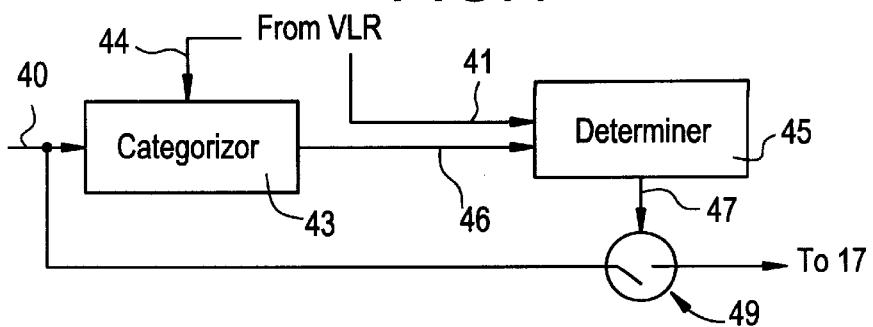

LOCATION TRIGGERED BARRING OF CALL FORWARDING

FIELD OF THE INVENTION

The invention relates generally to wireless mobile communications and, more particularly, to improvements in call forwarding services provided to wireless mobile communication subscribers.

BACKGROUND OF THE INVENTION

In conventional wireless mobile communications, roaming agreements typically exist between network operators of respective public land mobile networks (PLMNs). Such roaming agreements permit a mobile subscriber unit based in a first PLMN to use the services and facilities of a second PLMN while the mobile subscriber unit is roaming in the coverage area of the second PLMN, outside the coverage area of the first PLMN.

Call forwarding (CF) is one example of a service that a roaming mobile subscriber might wish to use while roaming in the second PLMN. Using the conventional GSM (Global System for Mobile communications) network as an example of the first and second PLMNs, in a conventional GSM network the cost of forwarding (or otherwise deflecting) a call is charged to the mobile subscriber which invoked the forwarding. If the mobile subscriber is roaming internationally, then the forwarding of a call will very likely be charged, disadvantageously, as an international call. Paying international call charges to forward a call is typically very expensive.

Call deflecting service is similar to call forwarding, except the mobile subscriber interactively chooses (on a per call basis) to deflect the call to another destination rather than accept the call, whereas call forwarding services are typically handled in the serving mobile switching center (MSC) without interaction of the mobile subscriber. The problems and inventive solutions disclosed herein apply to both call forwarding and call deflecting services.

Another problem with forwarding the calls of the above-described roaming mobile subscriber is fraud. Call forwarding fraud during roaming occurs when the mobile subscriber uses call forwarding service to forward calls received while the mobile subscriber is roaming internationally, but for which the roaming mobile subscriber does not intend to pay the corresponding international charges. Such fraud can be increased by maintaining several simultaneous calls after invocation of the call forwarding service. The same scenario can occur using call diversion service. This fraud problem is very costly for network operators due to the international signaling links and call legs involved during the calls. In fact, fraud is such a large scale problem that network operators in some countries refuse to provide services such as call forwarding services to mobile subscribers roaming in those countries.

In GSM, there are some conventional mechanisms for cost limitation when the mobile subscriber is roaming. For example, an operator determined bar (ODB) can be applied to outgoing calls originating at the mobile subscriber unit, including calls to be forwarded, such that the invocation of call forwarding services is barred. The ODB in GSM also provides for different restriction levels, for example, barring all calls, all international calls, all international calls except those directed to the mobile subscriber's home PLMN country, all inter-zone calls, or all inter-zone calls except those directed to the subscriber's home PLMN country. However, this solution will disadvantageously bar even outgoing calls for which the mobile subscriber consciously intends to pay the incurred cost.

Another possible solution to the above-described call forwarding problems is simply for the mobile subscriber to deactivate the call forwarding services. However, the subscriber may well forget to deactivate the services when roaming internationally. Moreover, deactivation of call forwarding does not address the fraud problem described above.

Call forwarding can be barred using conventional Regional Services functionality, but only by disadvantageously deregistering the mobile station from all services to which it subscribes whenever that mobile station enters the service area of a disallowed MSC. Moreover, this type of service must be implemented in the MSC/VLR and can only be used if the Regional Services functionality is implemented in the PLMN where the subscriber is roaming.

Another possible approach would be to use Intelligent Network (IN) architecture to implement services aimed at solving the above-described problems. However, disadvantageously, the Intelligent Network support must be requested in the PLMN where the subscriber is roaming.

It is therefore desirable to provide to a roaming mobile subscriber call forwarding (or deflecting) service with automatically activated security against large, unwanted charges for forwarding/deflecting calls without barring all of the mobile subscriber's outgoing calls.

The present invention provides for selective barring of call forwarding/deflecting services. The selective barring is triggered by the location of the mobile subscriber unit, thereby avoiding the occurrence of many unwanted call forwarding/deflecting charges when the mobile subscriber unit is roaming, and all outgoing calls need not be barred.

BRIEF DESCRIPTION OF THE DRAWINGS

FIG. 2 illustrates an example of a memory and database in the HLR of FIG. 1.

FIG. 3 illustrates one example portion of the HLR of FIG. 1 in greater detail.

FIG. 4 illustrates an example portion of the MSC/VLR of FIG. 1 in greater detail.

DETAILED DESCRIPTION

Figure 1:
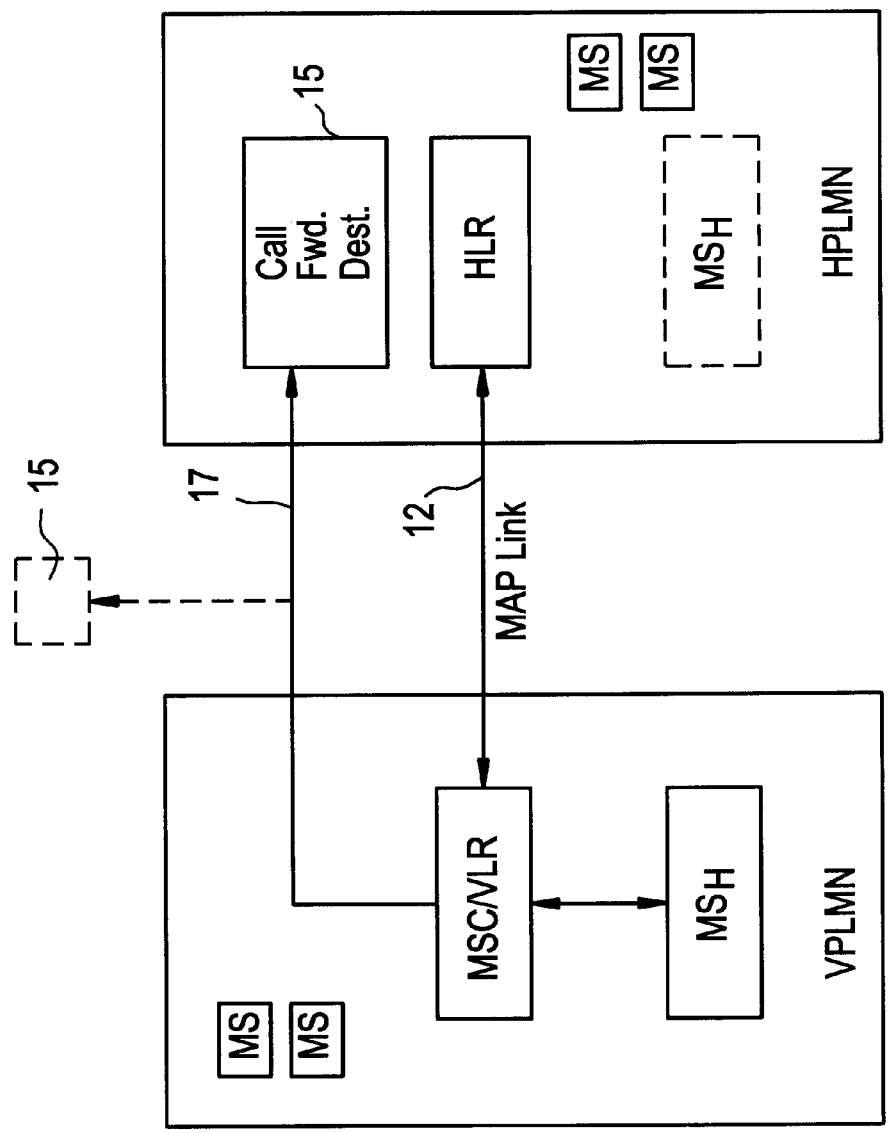
FIG. 1 illustrates two inter-networked PLMNs including a call forward barring feature according to the invention.

FIG. 1 illustrates an example of an inter-networking mobile communications arrangement that implements the present invention. In FIG. 1, a mobile subscriber unit $MS_H$ has roamed from the coverage area of its home PLMN, designated in FIG. 1 as HPLMN, into the coverage area of a visited PLMN, designated in FIG. 1 as VPLMN. Conventional examples of the HPLMN and VPLMN of FIG. 1 include GSM, DCS 1800 (Digital Cellular System for Mobile Communications), and PCS (Personal Communications System). The HPLMN and VPLMN of FIG. 1 can be defined, for example, by any of the foregoing conventional network standards, such conventional networks of course being enhanced as disclosed herein to include the present invention.

Although only pertinent portions of HPLMN and VPLMN are illustrated in FIG. 1 for clarity of exposition, it will be recognized that HPLMN and VPLMN of FIG. 1 represent fully functional PLMNs. For example, the VPLMN includes a home location register HLR (or a suitable equivalent) similar to that shown in the HPLMN, and the HPLMN includes a mobile services switching center and visited location register (collectively designated as MSC/VLR in FIG. 1) similar to that illustrated in the VPLMN. One example of an equivalent alternative to the MSC/VLR of FIG. 1 is an SGSN (Serving GPRS Support Node). As mentioned above, with the exception of the herein described enhancements according to the present invention, the HPLMN and VPLMN of FIG. 1 can be, and for purposes of this description are assumed to be, otherwise conventional.

Mobile subscriber $MS_H$ is shown in broken lines in HPLMN to indicate that it has roamed out of HPLMN and into VPLMN where $MS_H$ is shown to be visiting. Other mobile subscriber units MS are shown in both the HPLMN and the VPLMN. Although the present invention is described with respect to the mobile subscriber unit $MS_H$, the principles of the invention are equally applicable to any of the mobile subscriber units MS when they roam, for example, outside of their home PLMN.

When $MS_H$ roams into VPLMN, it checks in with MSC/VLR (as is conventional), which requests a Location Update from the HLR of HPLMN using the MAP communications link illustrated diagrammatically at 12 in FIG. 1. MAP refers to conventional Mobile Application Part signaling. This MAP "Location Update" operation is well-known in the art, and provides to HLR current location information regarding $MS_H$, along with other conventional information. In response to the MAP "Location Update" request, the HLR conventionally responds with a MAP "Insert Subscriber Data" message signaled, for example, over the MAP link 12. According to the invention, the HLR also provides, in the "Insert Subscriber Data" message, information relative to call forwarding/deflecting services, for example, whether or not call forwarding services subscribed to by $MS_H$ are to be barred. The MSC/VLR of VPLMN uses this bar information from HLR to decide whether or not to permit calls for $MS_H$ to be forwarded (or deflected) to another destination, for example at 15, via a communications path 17. The destination 15 could also be located elsewhere, e.g. in another PLMN outside both PLMNs of FIG. 1, or in a Public Switched Telephone Network (PSTN) as shown by broken lines.

FIG. 2 illustrates one example of a memory 21 in the HLR of FIG. 1. The memory 21 has stored therein a database 23 as shown. The database 23 includes information about operator determined barring (ODB) services to which various mobile subscribers have subscribed. Column 25 illustrates the mobile subscriber units (also referred to as mobile stations) MS1, MS2, etc. which have subscribed to ODB services. Column 27 illustrates the areas (designated A1, A2, etc. in which the subscribed ODBs are effective, and column 29 illustrates the calls which are barred (designated as Calls1, Calls2, etc.) when the respective mobile stations are located in the respective areas A1, A2, etc. of column 27.

Examples of the effective areas A1, A2, etc. in column 27 of FIG. 2 include: outside of the mobile subscriber's HPLMN coverage area; outside of the mobile subscriber's HPLMN country; and outside of the mobile subscriber's HPLMN zone. Examples of the barred calls represented by Calls1, Calls2, etc. in column 29 of FIG. 2 include: all forwarding calls; all international forwarding calls; all international forwarding calls except those directed to the subscriber's HPLMN country; all inter-zone forwarding calls; and all inter-zone forwarding calls except those directed to the subscriber's HPLMN country. These examples of effective areas and categories of forwarding (or deflecting) calls can be seen to yield, in this example, 15 distinct subscriptions available to the mobile subscribers. More specifically, for each of the aforementioned three effective areas, there are five different categories of calls which can be barred. Of course, the number and definition of effective ODB areas and the number and definition of barred calls categories can be set up as needed by the network operator in order to obtain the ODB functionality that is desired.

FIG. 3 illustrates an example portion 31 of the HLR of FIG. 1. The portion 31 may be used to implement the ODB services defined in FIG. 2. In FIG. 3, a detector 33 receives as inputs the location of the mobile subscriber and the effective bar area, and provides an output signal 35 indicative of whether or not the Mobile subscriber is located in the corresponding bar area. For example, and referring also to FIG. 2, the output signal 35 from the detector 33 would indicate whether or not the mobile station MS1 is within the bar area A1. If MS1 is located in area A1, then the output signal 35 will control multiplexer 37 such that the barred calls input of multiplexer 37 is coupled to the output of multiplexer 37. In this example, the barred calls input of multiplexer 37 would be the barred calls definition represented by Calls1 in column 29 of the database 23 in FIG. 2. If MS1 is not located in area A1, then signal 35 will couple the Null input of multiplexer 37 to the output of multiplexer 37. The Null input indicates that no ODB is to be implemented. The output of multiplexer 37 is provided to VLR (see FIG. 1) as part the MAP "Insert Subscriber Data" message sent over MAP link 12.

FIG. 4 illustrates example portions of MSC/VLR in the VPLMN of FIG. 1. When at 40 the MSC receives a call for $MS_H$ that is to be forwarded (or receives from MSH a call to be deflected), the call to be forwarded is input to a categorizor 43, which examines and categorizes the call that is to be forwarded. Then, a determiner 45 receives from categorizor 43 a signal 46 indicative of the category of the call. The determiner also receives from VLR an input 41 indicative of any forwarding calls which are barred and thus will not be forwarded from the mobile subscriber unit $MS_H$. If the determiner 45 determines that the call category as output from categorizor 43 corresponds to the information from VLR regarding the category of calls to be barred, then the output signal 47 from determiner 45 maintains switch 49 in the open position, so that the call is not forwarded to the destination (e.g. 15 of FIG. 1). However, if the determiner 45 determines that the category of the call to be forwarded does not fall within the barred call category information received from VLR, then the output 47 of determiner 45 closes switch 49 to permit the call to be forwarded from the MSC to the destination 15 via the communication path 17 of FIG. 1.

For example, if the output 46 of categorizor 43 indicates that the call at 40 is an international forwarding call directed to the mobile subscriber's HPLMN country, and if the barred call category information 41 from VLR indicates that all international forwarding calls except those directed to the mobile subscriber's HPLMN country are to be barred, then the determiner 45 will close the switch 49 to permit forwarding of the call. On the other hand, using the same call to be forwarded and thus the same output 46 from the categorizor 43, but assuming that the information 41 from VLR indicates that all international forwarding calls are barred, then the determiner 43 will maintain the switch 49 open to prevent the call from being forwarded. Information about the HPLMN and HPLMN country of $MS_H$ is provided by VLR to categorizor 43 at input 44. VLR receives the HPLMN and HPLMN country information from HLR in the MAP "Insert Subscriber Data" message.

Figure 5:
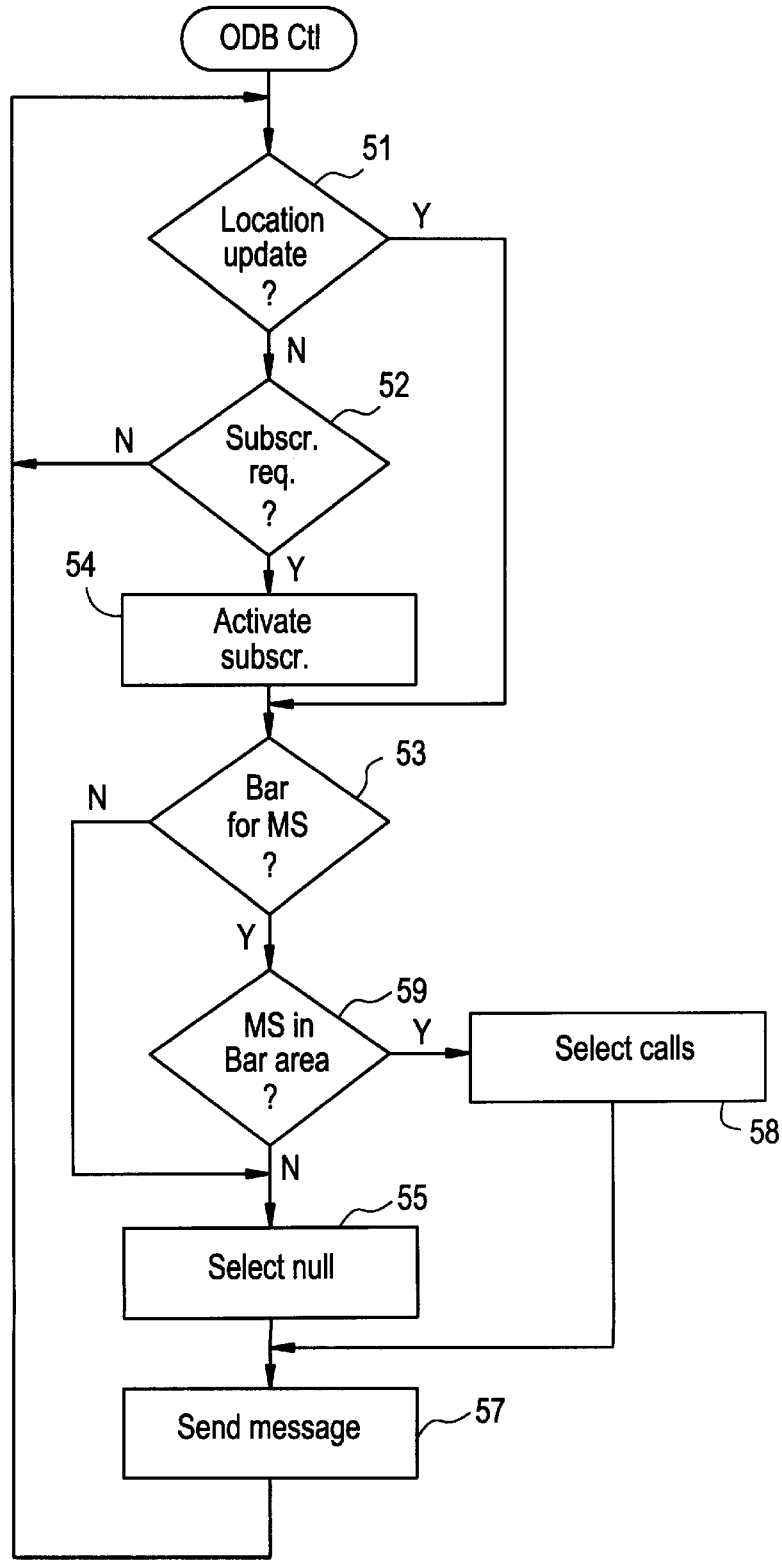
FIG. 5 illustrates exemplary operations of the HLR portion of FIG. 3.

FIG. 5 illustrates an example of the ODB control operations implemented by the example HLR portion of FIG. 3. In FIG. 5, it is first determined at 51 whether a MAP "Location Update" message has been received from an MSC/VLR, for example in the VPLMN of FIG. 1. If so, it is then determined at 53 whether or not the mobile subscriber associated with the Location Update message has subscribed to an ODB. If not, then the database 23 of FIG. 2 will yield a null value to be applied to the bar area input of detector 33 in FIG. 3. (For example, if the mobile subscriber has not subscribed to an ODB, then that mobile subscriber would not have a corresponding entry in the database 23, resulting in the null input to detector 33). This null value at the bar area input of detector 33 will cause the detector output 35 to select the null value at multiplexer 37, which step is illustrated at 55 in FIG. 5. Thereafter, at 57 the HLR sends a MAP Insert Subscriber Data message to the MSC/VLR via the MAP signaling link of FIG. 1. Information from this Insert Subscriber Data message, including the null value from multiplexer 37, will be stored in the VLR, and the null value will be provided at 41 to the determiner 45 (see FIG. 4). This null value indicates to the determiner that no ODBs are in effect for the mobile subscriber, so that all calls can be forwarded (or deflected) through the switch 49, regardless of the output 46 from the categorizor.

If at 53 the HLR determines that the mobile subscriber does subscribe to an ODB, then at 59 the detector 33 of FIG. 3 determines whether or not the mobile subscriber is located in an effective bar area. The MS location input to the detector 33 is of course received in the MAP "Location Update" message (see 51). If at 59 the detector 33 determines that the mobile subscriber is not located in the bar area, then the null value is selected at 55 to be output from the multiplexer 37 of FIG. 3, as described above. If at 59 the detector 33 determines that the mobile subscriber is located in the associated bar area, then at 58 the control signal 35 of FIG. 3 causes the multiplexer 37 to select the barred calls information. Thereafter, the Insert Subscriber Data message is sent over the MAP link (see FIG. 1), and the barred calls information is stored in the VLR of the VPLMN.

In FIG. 5 if no "Location Update" message is received at 51, it is determined at 52 whether an ODB subscription request has been received. Such a subscription request is typically done by the operator using the conventional operation and maintenance system. If so, then the ODB subscription is activated at 54, for example, by inserting into the database 23 of FIG. 2 an entry identifying the mobile station, the bar area and the barred calls. Thereafter, the same steps (53, 55, 57, 58 and 59) are executed as described above with respect to the receipt of a "Location Update" message at 51. Thus, when a mobile subscriber that already subscribes to call forwarding (or deflecting) requests an ODB subscription at 52, if that mobile subscriber is in the bar area corresponding to the ODB being subscribed to (see 59), then the barred calls information from the database of FIG. 2 will be transmitted in an Insert Subscriber Data message to the MSC/VLR currently visited by that mobile subscriber (see 57 and 58).

Figure 8:
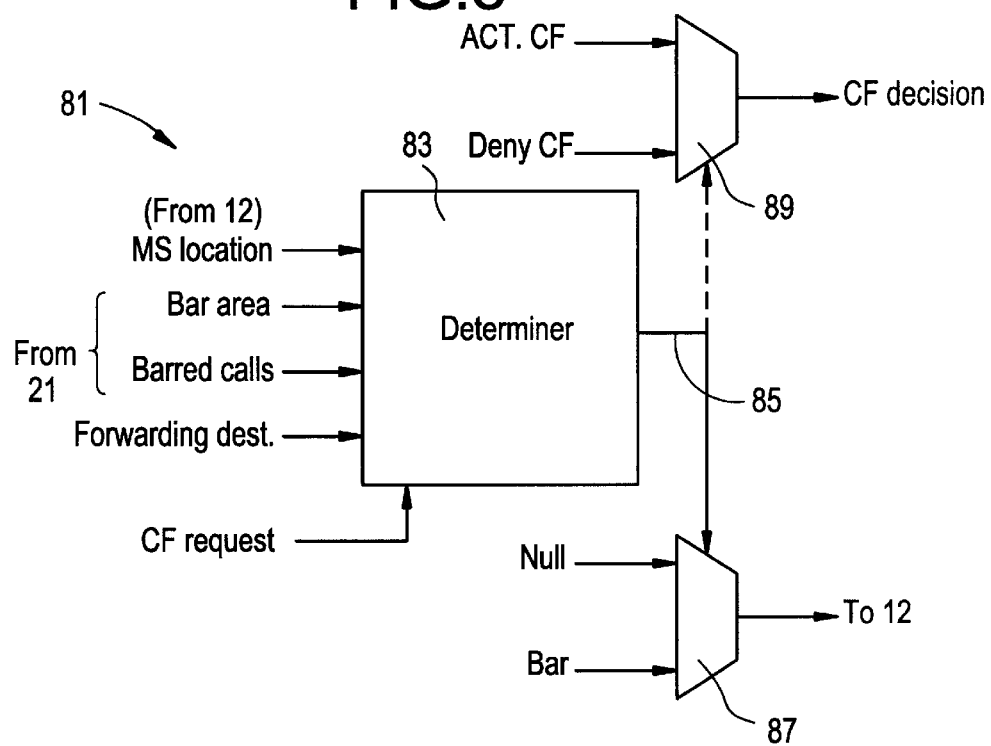
FIG. 8 illustrates another example portion of the HLR of FIG. 1 according to another embodiment of the invention.

FIG. 8 illustrates another example portion 81 of the HLR of FIG. 1 according to another embodiment of the invention. The portion 81 implements the ODB functionality of the present invention without requiring any modifications to the conventional MSC/VLR design. Because the mobile station's call forwarding subscription is conventionally recorded in HLR, the forwarding destination number is already conventionally stored in HLR. Thus, the determiner 83 of FIG. 8 examines the mobile station location information (from the "Location Update" request), the bar area information (from FIG. 2), the barred calls information (from FIG. 2), and the known forwarding destination information, and determines therefrom whether the mobile station is in a barred area and whether a forwarding call to the forwarding destination falls in the barred calls category. The determiner output 85 then selects at multiplexer 87 either a null message or a bar message to be sent to MSC/VLR in the "Insert Subscriber Data" message. Information about whether or not to inhibit call forwarding is conventionally included in the "Insert Subscriber Data" message, for example, the so-called active quiescent state in GSM, so the ODB of the invention can be implemented by suitably communicating the conventional active-quiescent state to a conventional MSC/VLR design.

The example portion 81 of HLR illustrated in FIG. 8 can alternatively be used to approve or deny a request to activate call forwarding services for a mobile subscriber that already subscribes to the ODB services of the invention. For example, if the HLR of FIG. 1 receives a request (see CF request in FIG. 8) from a mobile station (that already subscribes to the ODB service) to activate call forwarding services for that mobile Stall on, then determiner 83 will determine whether or not the mobile station, for example MS1 of FIG. 2, is in its associated bar area, in this example, area A1, and whether or not the barred calls category, in this example Calls1, includes a call to the forwarding destination. If the mobile station is in area A1 (the location of the mobile station is known from the most recent Location Update Message) and the Calls1 category includes calls to the forwarding destination, then the determiner output 85 will control multiplexer 89 (via the broken lines shown in FIG. 8) such that the deny CF input of multiplexer 89 is coupled to the output thereof. Thus, the HLR determines that call forwarding should not be activated for a mobile station which is currently located in an effective bar area according to its own ODB subscription, and whose selected forwarding destination falls within the effective barred calls category of its own ODB subscription. On the other hand, if the determiner 83 does not detect that mobile station MS1 is in area A1, or does not determine that a call to the forwarding destination falls in the Calls1 category, the determiner output 85 controls multiplexer 89 such that the activate call forwarding (ACT.CF) input of multiplexer 89 is coupled to the output thereof. In this manner, the HLR makes the decision of whether or not to activate call forwarding services for the particular mobile subscriber.

Figure 9:
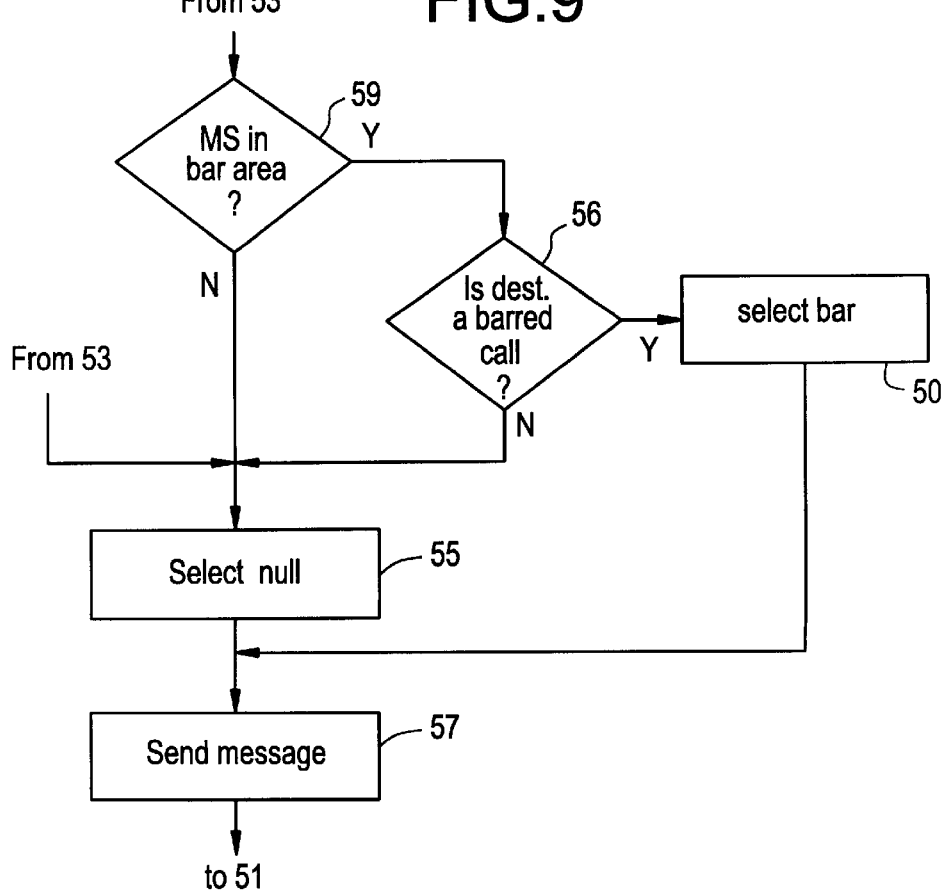
FIG. 9 illustrates exemplary operations of the HLR portion of FIG. 8.

FIG. 9 illustrates example operations of the HLR portion 81 of FIG. 8. FIG. 9 is the same as the example of FIG. 5 up to decision block 59. At block 59, if the MS is in the bar area, it is then determined at 56 whether a call to the forwarding destination is in the barred calls category. If so, then the bar message is selected at 50 (see 87 in FIG. 8), and, if not, then the null message is selected at 55 (see 87 in FIG. 8). After the message is selected at 50 or 55, the message is sent at 57 as in FIG. 5.

Figure 6:
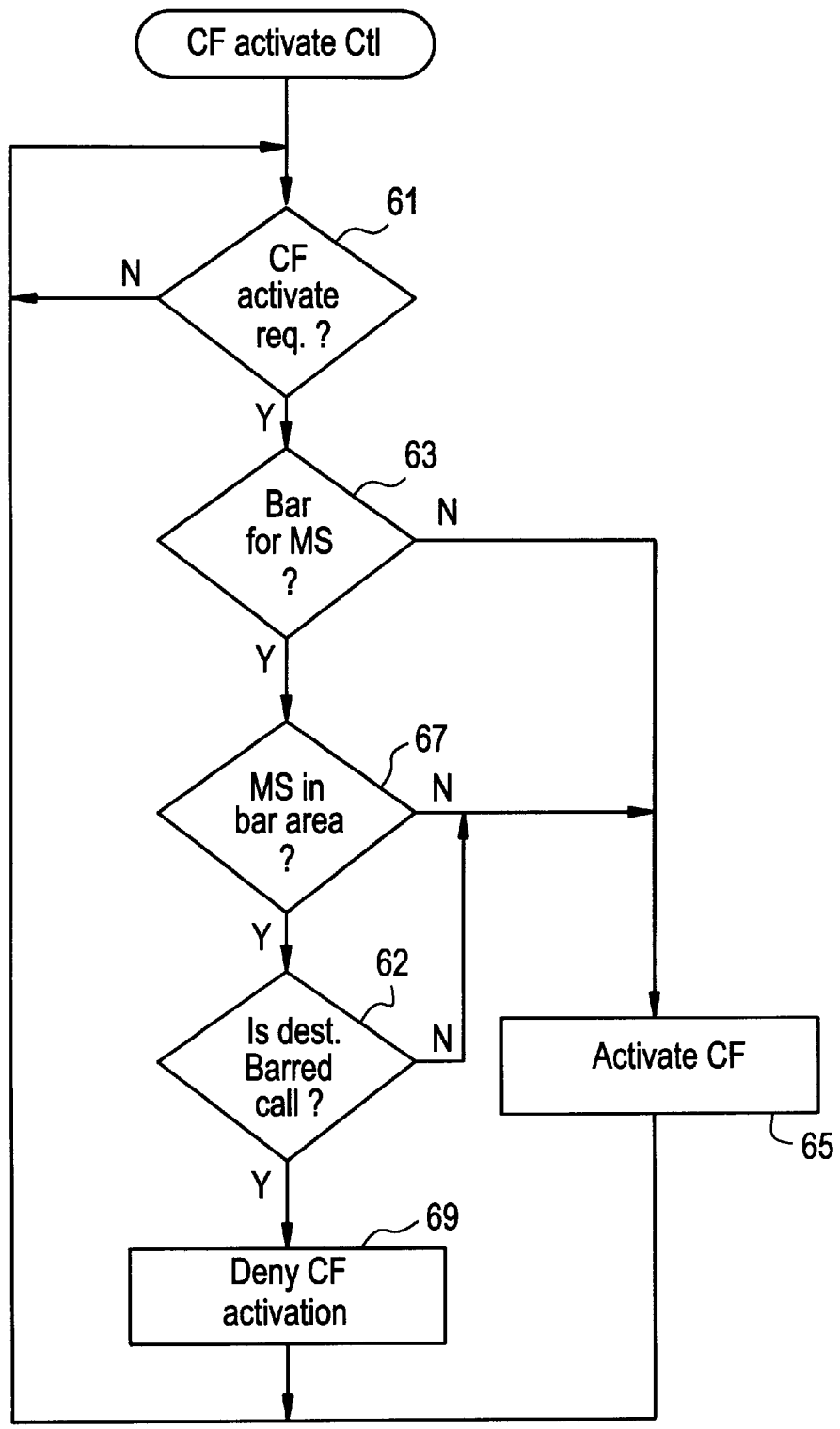
FIG. 6 illustrates exemplary operations of the HLR portion of FIG. 8.

FIG. 6 illustrates an example of the operation of the HLR portion of FIG. 8 to control activation of call forwarding (or deflecting) services. At 61, once a request to activate call forwarding is received, it is next determined at 63 whether the requesting mobile subscriber currently subscribes to an ODB. If not, the call forwarding services are activated conventionally at 65, after which the next request to activate call forwarding is awaited at 61. If it is determined at 63 that the requesting mobile subscriber does subscribe to an ODB, it is then determined at 67 whether or not the mobile subscriber is in the bar area associated with the ODB subscription. If not, then the call forwarding services are activated at 65 as above (see 89 of FIG. 8). If the requesting mobile subscriber is in the bar area associated with its own ODB subscription, it is then determined at 62 whether a call to the forwarding destination falls in the barred calls category. If so, then activation of call forwarding services is denied at 69 (see 89 of FIG. 8). If a call to the destination number does not represent a barred call at 62, then call forwarding is activated at 65. Thereafter, the next request for activation of call forwarding is awaited at 61.

Figure 7:
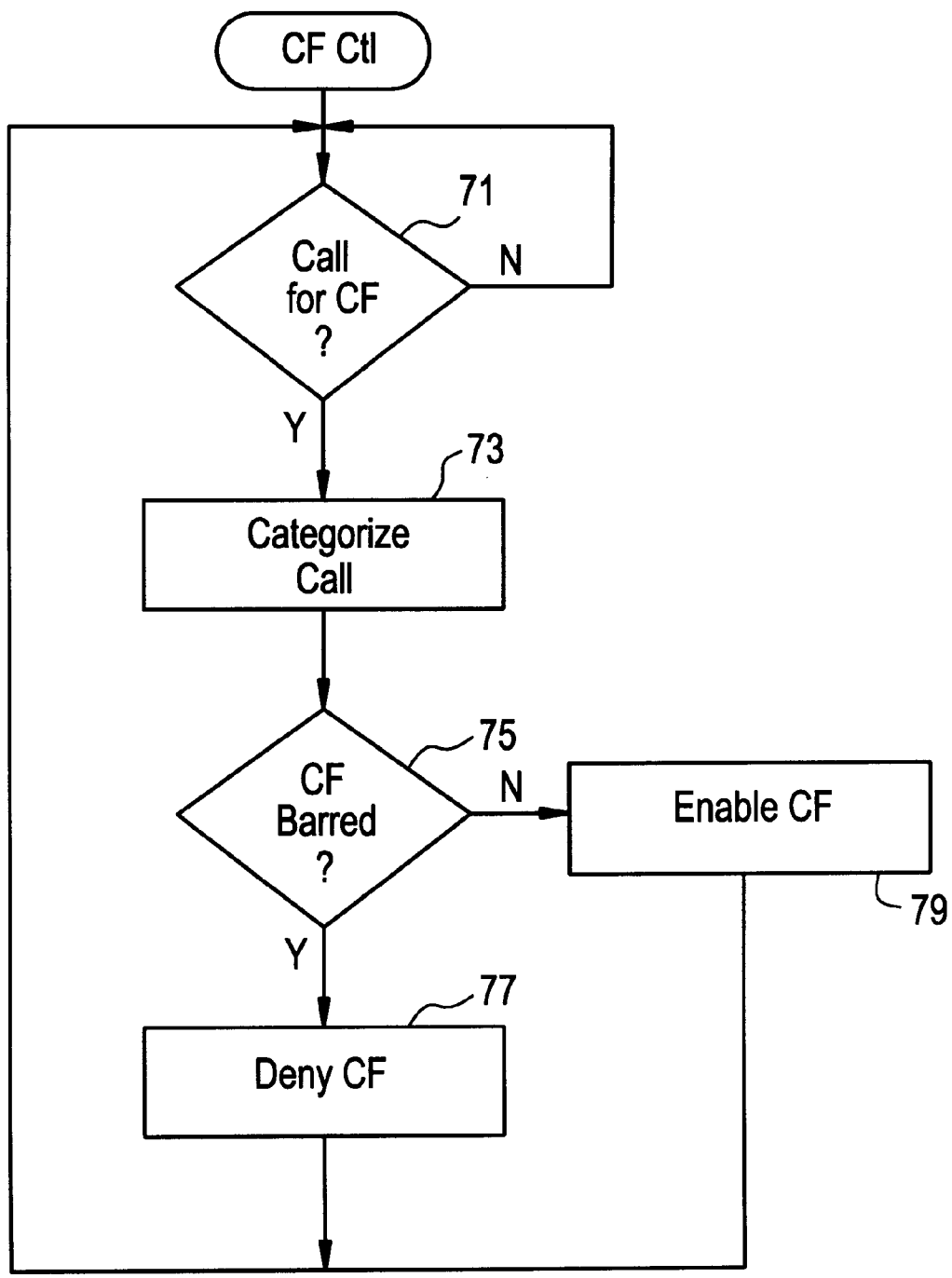
FIG. 7 illustrates exemplary operations of the MSC/VLR portion of FIG. 4.

FIG. 7 illustrates an example of call forwarding (or deflecting) control operations performed by the MSC/VLR portion shown in FIG. 4. It is first determined at 71 whether the MSC has received a call to be forwarded. If so, then at 73 the categorizor of FIG. 4 categorizes the call, and at 75 the determiner of FIG. 4 determines whether or not call forwarding is barred for that particular call. If call forwarding is barred, then the call forwarding is denied at 77 by leaving the switch of FIG. 4 in the open position. If call forwarding is not barred at 75, then at 79 call forwarding is enabled by closing the switch of FIG. 4. During call forwarding operation, the switch 49 of FIG. 4 remains closed until the forwarded call has been completed, whereupon the switch is reopened and remains so until call forwarding is next enabled. This control of the switch prevents any calls from being forwarded until it is adequately determined that no ODB is applicable to the candidate for forwarding. After the decision to enable or deny call forwarding has been made and the appropriate action taken at 75, 77, and 79, the next candidate for call forwarding is awaited at 71.

By using the location of the mobile subscriber as a trigger to bar call forwarding (or deflecting) without barring all outgoing calls, call forwarding costs for roaming subscribers can be controlled, and fraud can be avoided, without restricting all outgoing calls, or all international calls, and without unconditionally barring call forwarding. The location-triggered ODB can be advantageously implemented by suitably modifying one or more of the conventional HLR, VLR and MSC nodes as needed and, further advantageously, the conventional MAP signaling protocol can be used.

It will be clear to workers in the art that the embodiments of FIGS. 1–9 can be readily implemented, for example, in hardware, or software, or suitable combinations of hardware and software in a conventional HLR, a conventional MSC, and a conventional VLR.

Although exemplary embodiments of the present invention have been described above in detail, this does not limit the scope of the invention, which can be practiced in a variety of embodiments.

What is claimed is:

1. An apparatus for controlling call forwarding service provided to a wireless mobile communication station, comprising:
    an input for receiving information indicative of a location of the wireless mobile communication station and for receiving information indicative of a call forwarding bar area, and a determiner coupled to said input, said determiner having an output responsive to said location information and said call forwarding bar area information for indicating that call forwarding from the wireless mobile communication station is barred, without indicating that other outgoing calls from the wireless mobile communication station are barred.

2. The apparatus of claim 1, wherein said call forwarding bar area is located outside of a coverage area associated with a home mobile communication network of the wireless mobile communication station.

3. The apparatus of claim 1, wherein said call forwarding bar area is located outside of a country in which is located a coverage area associated with a home mobile communication network of the wireless mobile communication station.

4. The apparatus of claim 1, wherein said call forwarding bar area is located outside of a zone in which is included a coverage area associated with a home mobile communication network of the wireless mobile communication station.

5. The apparatus of claim 1, wherein said input is further for receiving call identification information that identifies forwarding calls to be barred, and wherein said output is further responsive to said call identification information for indicating that call forwarding from the wireless mobile communication station is barred.

6. The apparatus of claim 5, including a memory coupled to said input and having stored therein an entry that includes said call forwarding bar area information.

7. The apparatus of claim 6, wherein said entry includes station identification information that identifies the wireless mobile communication station.

8. The apparatus of claim 7, wherein said entry includes said call identification information.

9. The apparatus of claim 5, including a memory coupled to said input and having stored therein an entry which includes said call identification information.

10. The apparatus of claim 9, wherein said entry indicates that all forwarding calls are to be barred.

11. The apparatus of claim 9, wherein said entry indicates that all international forwarding calls are to be barred.

12. The apparatus of claim 9, wherein said entry indicates that all inter-zone forwarding calls are to be barred.

13. The apparatus of claim 1, wherein said determiner is operable for indicating that call forwarding from the wireless mobile communication station to a forwarding destination is barred, without indicating that all other types of outgoing calls from the wireless mobile communication station to said forwarding destination are barred.

14. The apparatus of claim 1, wherein said input is further for receiving information indicative of an area into which call forwarding from the wireless mobile communication station is prohibited when the wireless mobile communication station is located in the call forwarding bar area, said determiner operable in response to said prohibited area information and said call forwarding bar area information and said location information for indicating that call forwarding from the wireless mobile communication station is barred.

15. An apparatus for controlling call forwarding service provided to a wireless mobile communication station, comprising:
    an input for receiving information indicative of a location of the wireless mobile communication station; and
    an output for indicating, based on the location information, that call forwarding from the wireless mobile communication station to a forwarding destination is barred, without indicating that all other types of outgoing calls from the wireless mobile communication station to the forwarding destination are barred.

16. A method of controlling call forwarding service provided to a wireless mobile communication station, comprising:

receiving information indicative of a location of the wireless mobile communication station;

receiving information indicative of a call forwarding bar area; and indicating, based on the location information and the call forwarding bar area information, that call forwarding from the wireless mobile communication station is barred, without indicating that other outgoing calls from the wireless mobile communication station are barred.

17. The method of claim 16, wherein said call forwarding bar area is located outside of a coverage area associated with a home mobile communication network of the wireless mobile communication station.

18. The method of claim 16, wherein the call forwarding bar area is located outside of a country in which is located a coverage area associated with a home mobile communication network of the wireless mobile communication station.

19. The method of claim 16, wherein the call forwarding bar area is located outside of a zone in which is included a coverage area associated with a home mobile communication network of the wireless mobile communication station.

20. The method of claim 16, wherein said indicating step includes determining from the location information and the call forwarding bar area information whether the wireless mobile communication station is located in the call forwarding bar area.

21. The method of claim 20, wherein said indicating step includes indicating that call forwarding is barred when (1) the wireless mobile communication station is determined to be located in the call forwarding bar area and (2) a call forwarding destination associated with the mobile station requires a forwarding call that is included in a predetermined category of calls barred to the mobile station while the mobile station is in the call forwarding bar area.

22. The method of claim 16, including identifying forwarding calls which are to be barred.

23. The method of claim 22, wherein said identifying step includes indicating that all forwarding calls are to be barred.

24. The method of claim 22, wherein said identifying step includes identifying all international forwarding calls to be barred.

25. The method of claim 22, wherein said identifying step includes identifying all inter-zone forwarding calls to be barred.

26. The method of claim 16, wherein said indicating step includes indicating that call forwarding from the wireless mobile communication station to a forwarding destination is barred, without indicating that all other types of outgoing calls from the wireless mobile communication station to said forwarding destination are barred.

27. The method of claim 16, including receiving information indicative of an area into which call forwarding from the wireless mobile communication station is prohibited when the wireless mobile communication station is located in the call forwarding bar area, said indicating step including indicating, based on the location information and the call forwarding bar area information and the prohibited area information, that call forwarding from the wireless mobile communication station is barred.

28. A method of controlling call deflecting service provided to a wireless mobile communication station, comprising:

receiving information indicative of a location of the wireless mobile communication station;

receiving information indicative of a call deflecting bar area; and indicating, based on the location information and the call deflecting bar area information, that call deflecting from the wireless mobile communication station is barred, without indicating that other outgoing calls from the wireless mobile communication station are barred.

29. The method of claim 28, wherein said indicating step includes indicating that call deflecting from the wireless mobile communication station to a deflecting destination is barred, without indicating that all other types of outgoing calls from the wireless mobile communication station to said deflecting destination are barred.

30. The method of claim 28, including receiving information indicative of an area into which call deflecting from the wireless mobile communication station is prohibited when the wireless mobile communication station is located in the call deflecting bar area, said indicating step including indicating, based on the location information and the call deflecting bar information and the prohibited area information, that call deflecting from the wireless mobile communication station is barred.

31. An apparatus for controlling call forwarding service provided to a mobile station, without modifying mobile switching center/visitor location register design, comprising:

an input for receiving information indicative of a location of the mobile station sent from a mobile switching center/visitor location register;

a storage portion for storing therein call forwarding destination information, call forwarding bar area information and barred forwarding calls information associated with the mobile station; and a determiner coupled to said input and said storage apparatus, said determiner having an output responsive to said location information and said call forwarding bar area information and said barred forwarding calls information and said call forwarding destination information for indicating to said mobile switching center/visitor location register that call forwarding from said mobile station is barred, without indicating that other outgoing calls from said mobile station are barred.

32. The apparatus of claim 31, provided in a home location register (HLR).

* * * * *